(12) United States Patent
Yoon

(10) Patent No.: US 9,196,938 B2
(45) Date of Patent: Nov. 24, 2015

(54) BATTERY MODULE

(75) Inventor: Ji-Hyoung Yoon, Yongin-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 153 days.

(21) Appl. No.: 12/929,192

(22) Filed: Jan. 6, 2011

(65) Prior Publication Data

US 2012/0009455 A1    Jan. 12, 2012

Related U.S. Application Data

(60) Provisional application No. 61/344,360, filed on Jul. 6, 2010.

(51) Int. Cl.
*H01M 10/613* (2014.01)
*H01M 10/615* (2014.01)
*H01M 10/617* (2014.01)
(Continued)

(52) U.S. Cl.
CPC .......... *H01M 10/613* (2015.04); *H01M 10/615* (2015.04); *H01M 10/617* (2015.04); *H01M 10/65* (2015.04); *H01M 10/652* (2015.04); *H01M 10/653* (2015.04); *H01M 10/6551* (2015.04); *H01M 10/6552* (2015.04); *H01M 10/6554* (2015.04); *H01M 10/6555* (2015.04); *H01M 10/6556* (2015.04); *F28F 3/02* (2013.01); *F28F 2013/006* (2013.01); *H01M 10/625* (2015.04); *H01M 10/647* (2015.04); *H01M 10/655* (2015.04); *H01M 10/6561* (2015.04);
(Continued)

(58) Field of Classification Search
CPC ..................... H01M 10/5032; H01M 10/5036; H01M 10/5038; H01M 10/504; H01M 10/5044; H01M 10/5046; H01M 10/5048; H01M 10/5053; H01M 10/5055; H01M 10/5057; H01M 10/5061; H01M 10/5075; H01M 10/613; H01M 10/615; H01M 10/617; H01M 10/65; H01M 10/652; H01M 10/653; H01M 10/655; H01M 10/6551; H01M 10/6552; H01M 10/6554; H01M 10/6555; H01M 10/6556; H01M 10/6567
See application file for complete search history.

(56) References Cited

U.S. PATENT DOCUMENTS 5,756,227 A    5/1998   Suzuki et al.
7,968,223 B2   6/2011   Lee et al.
(Continued)

FOREIGN PATENT DOCUMENTS

CN         1972005 A        5/2007
DE    10 2005 031 504 A1    1/2007
(Continued)

OTHER PUBLICATIONS

European Search Report issued in corresponding application, EP 11 15 3473, dated May 18, 2011.
(Continued)

*Primary Examiner* — Eugenia Wang
(74) *Attorney, Agent, or Firm* — Lee & Morse, P.C.

(57) ABSTRACT

A battery module includes a plurality of adjoining of battery cells; heat conductive sheets between at least some adjacent battery cells, the heat conductive sheets being in thermal co-operation with the battery cells; a heat dispersion member coupled with the heat conductive sheets and in thermal co-operation therewith; and a heat dissipation member coupled with the heat dispersion member and in thermal co-operation therewith.

17 Claims, 15 Drawing Sheets

(51) Int. Cl.
  *H01M 10/65* (2014.01)
  *H01M 10/652* (2014.01)
  *H01M 10/653* (2014.01)
  *H01M 10/6551* (2014.01)
  *H01M 10/6552* (2014.01)
  *H01M 10/6555* (2014.01)
  *H01M 10/6556* (2014.01)
  *H01M 10/6554* (2014.01)
  *H01M 10/655* (2014.01)
  *F28F 3/02* (2006.01)
  *F28F 13/00* (2006.01)
  *H01M 10/625* (2014.01)
  *H01M 10/647* (2014.01)
  *H01M 10/6571* (2014.01)
  *H01M 10/6567* (2014.01)
  *H01M 10/6572* (2014.01)
  *H01M 10/6561* (2014.01)

(52) U.S. Cl.
  CPC ....... *H01M 10/6567* (2015.04); *H01M 10/6571* (2015.04); *H01M 10/6572* (2015.04)

(56) References Cited

U.S. PATENT DOCUMENTS

| | | | |
|---|---|---|---|
| 8,107,704 B2 | 1/2012 | Kanda et al. | |
| 8,268,474 B2 | 9/2012 | Kim et al. | |
| 8,293,397 B2 | 10/2012 | Uchida et al. | |
| 2001/0031392 A1 | 10/2001 | Ogata et al. | |
| 2005/0074666 A1 | 4/2005 | Kimiya et al. | |
| 2006/0110656 A1 | 5/2006 | Moores, Jr. et al. | |
| 2006/0216582 A1* | 9/2006 | Lee et al. | 429/120 |
| 2007/0018610 A1 | 1/2007 | Wegner | |
| 2009/0129026 A1 | 5/2009 | Baek et al. | |
| 2009/0142628 A1 | 6/2009 | Okada et al. | |
| 2009/0169978 A1 | 7/2009 | Smith et al. | |
| 2009/0173559 A1* | 7/2009 | Nakamura | 180/68.5 |
| 2009/0208829 A1* | 8/2009 | Howard et al. | 429/120 |
| 2011/0104545 A1 | 5/2011 | Meintschel et al. | |
| 2011/0300428 A1 | 12/2011 | Sohn | |

FOREIGN PATENT DOCUMENTS

| | | |
|---|---|---|
| DE | 10 2008 054 947 A1 | 6/2010 |
| EP | 1753058 A2 * | 2/2007 |
| EP | 1 970 982 A1 | 9/2008 |
| EP | 2 031 672 A1 | 3/2009 |
| EP | 2-187-473 A1 | 5/2010 |
| JP | 08-148187 A | 6/1996 |
| JP | 11-288744 A | 1/1999 |
| JP | 2001-297740 A | 10/2001 |
| JP | 2004-111370 A | 4/2004 |
| JP | 2007-048750 A | 2/2007 |
| JP | 2007-538373 A | 12/2007 |
| JP | 2008-059950 A | 3/2008 |
| JP | 2006-278327 A | 10/2008 |
| JP | 2008-301877 A | 12/2008 |
| JP | 2009-054403 A | 3/2009 |
| JP | 2009-134938 A | 6/2009 |
| JP | 2009-301877 A | 12/2009 |
| JP | 2010-040420 A | 2/2010 |
| JP | 2010-536127 A | 11/2010 |
| JP | 2011-253801 A | 12/2011 |
| KR | 2009-0051640 A | 5/2005 |
| WO | WO 2005/119813 A2 | 12/2005 |
| WO | WO 2007/043392 A1 | 4/2007 |
| WO | WO 2007132622 A1 * | 11/2007 |
| WO | WO 2009/018941 | 2/2009 |
| WO | WO 2010/069713 A1 | 6/2010 |

OTHER PUBLICATIONS

Office Communication issued in corresponding European application, 11 153 473.1, dated Sep. 3, 2012.
Office Action mailed Mar. 5, 2014 in corresponding Chinese Patent Application No. 201110186415.9.
European Office Action in EP 11 153 473.1-1360, dated Jan. 31, 2014.
Chinese Office Action in CN 201110186415.9, dated Jul. 17, 2013 (Yoon).
Chinese Office Action dated Jul. 31, 2014.
European Office action dated Oct. 12, 2015 for EP 11 153 473.1.

* cited by examiner

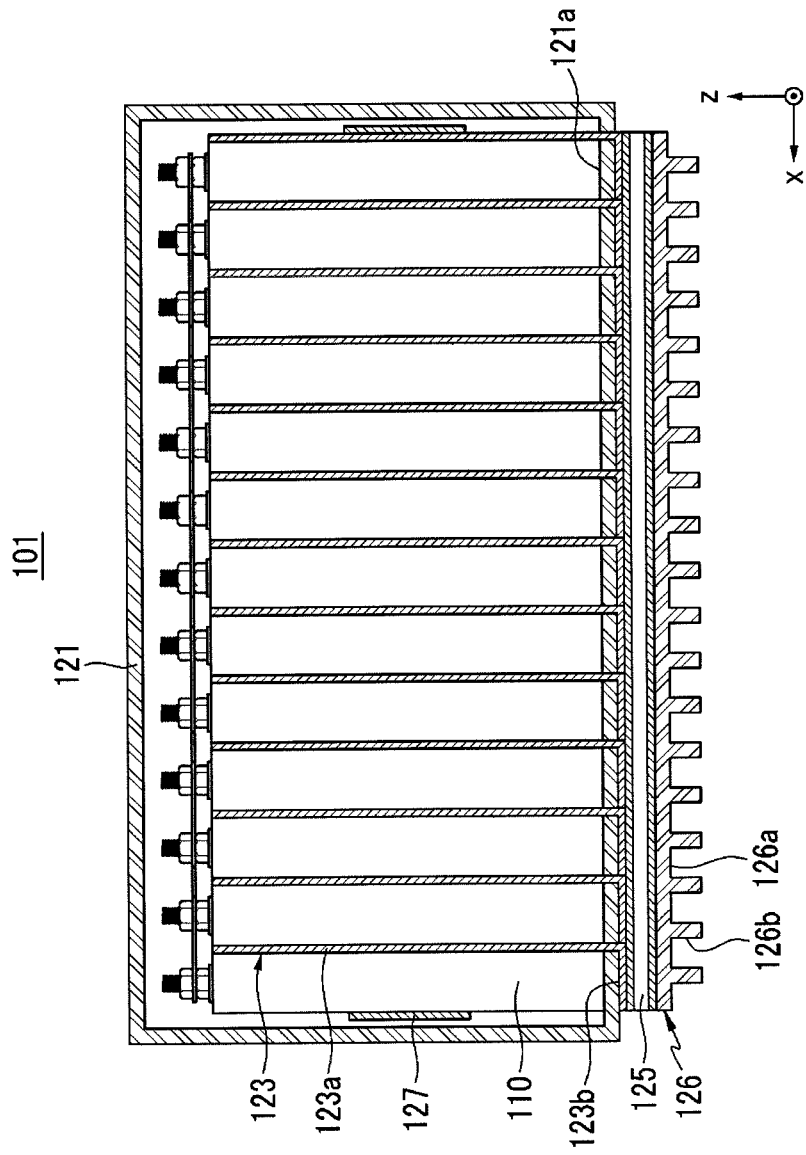

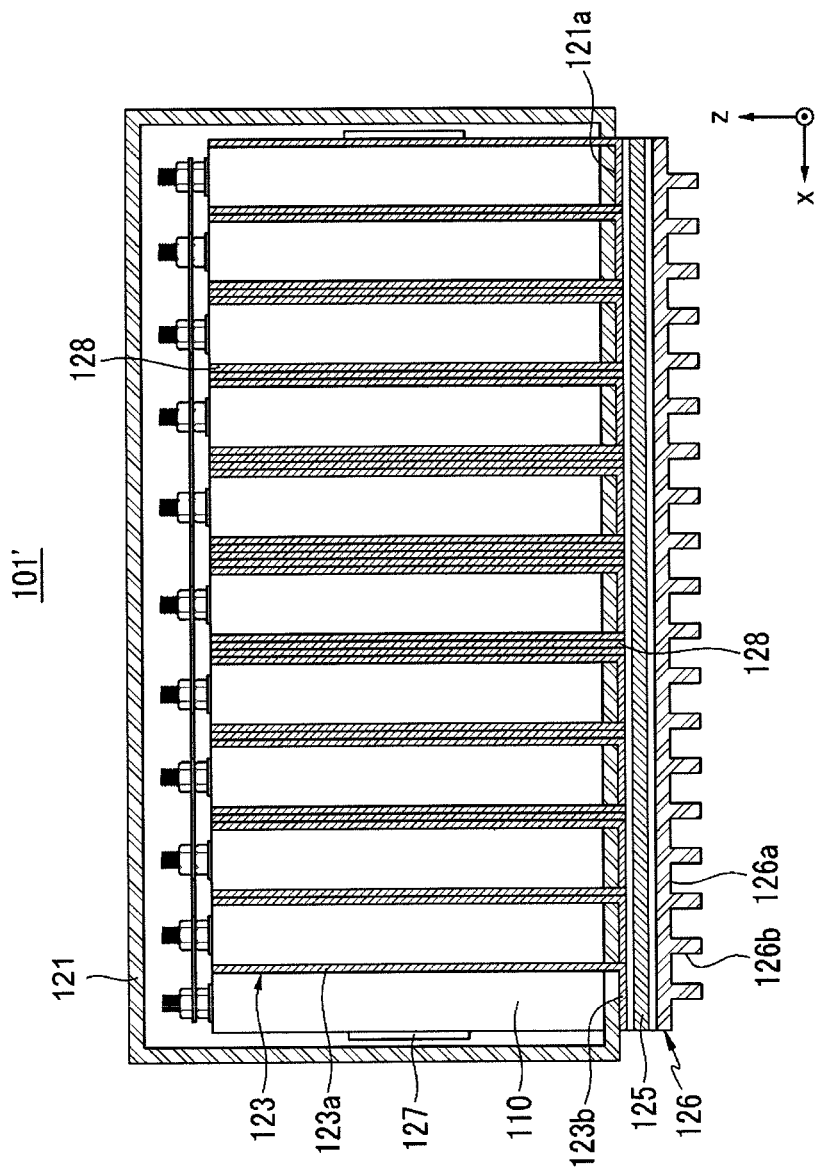

BATTERY MODULE

CROSS-REFERENCE TO RELATED APPLICATION

The present application claims priority under 35 U.S.C. §119(e) to U.S. Provisional Application No. 61/344,360, filed on Jul. 6, 2010, and entitled: "Battery Module," which is incorporated herein by reference in its entirety.

BACKGROUND

1. Field

Embodiments relate to a battery module.

2. Description of the Related Art

A rechargeable battery is a battery that is chargeable and dischargeable, unlike a primary battery that is not chargeable. Low-capacity rechargeable batteries may be used for small-sized portable electronic devices, e.g., a portable phone, a notebook computer, and a camcorder. High-capacity batteries may be used as power sources for, e.g., driving motors of hybrid cars and so on.

Recently, high-output rechargeable batteries using high-energy-density non-aqueous electrolytes have been developed. The high-output rechargeable batteries may be formed as high-output high-capacity battery modules by connecting a plurality of rechargeable batteries in series or in parallel such that they may be used to drive an apparatus requiring a large amount of power, e.g., motors of electrical cars.

Such a battery module may include several to several tens of rechargeable batteries. Thus, efficient radiation or dissipation of heat generated in each rechargeable battery is desirable.

The above information disclosed in this Background section is only for enhancement of understanding of the background of the invention and therefore it may contain information that does not form the prior art that is already known in this country to a person of ordinary skill in the art.

SUMMARY

Embodiments are directed to a battery module.

At least one of the above and other features and advantages may be realized by providing a battery module including a plurality of adjoining of battery cells; heat conductive sheets between at least some adjacent battery cells, the heat conductive sheets being in thermal co-operation with the battery cells; a heat dispersion member coupled with the heat conductive sheets and in thermal co-operation therewith; and a heat dissipation member coupled with the heat dispersion member and in thermal co-operation therewith.

The battery cells may be arranged in a stack that extends in a first direction, and the heat dispersion member may be between the heat dissipation member and the battery cells.

At least one of the heat conductive sheets may include a heat absorption part and a heat radiation part, the heat absorption part being between the adjacent battery cells and in thermal co-operation with a wide side surface of the battery cells, the heat radiation part being bent to extend away from the heat absorption part and being between the battery cells and the heat dispersion member.

The heat dissipation member may include a support plate and heat dissipation fins, the heat dissipation fins protruding from the support plate and the support plate being between the heat dissipation fins and the heat dispersion member.

The heat dissipation fins may extend in a second direction substantially perpendicular to the first direction.

Heat dissipation fins adjacent to a center of the stack of battery cells may be spaced apart at a spacing interval smaller than a spacing interval of heat dissipation fins adjacent to outer edges of the stack of battery cells.

The support plate of the heat dissipation member may include grooves and the heat dispersion member may be disposed in the grooves.

The heat dispersion member may include a coolant path for a coolant to flow therethrough.

The coolant path may include a plurality of heat pipes.

The heat pipes may extend in the first direction and may be spaced apart from each other along a second direction perpendicular to the first direction.

Heat pipes adjacent to a central axis of each of the battery cells may be spaced apart at a spacing interval smaller than a spacing interval of heat pipes adjacent to outer sides of the battery cells.

The heat pipes may extend in the first direction and have an arc shape with a concavity open toward an outer side of the battery cells.

The heat pipes may extend in a second direction different from the first direction and may be spaced apart from one another in the first direction.

Heat pipes adjacent to a center of the stack of battery cells may be spaced apart at a spacing interval in the first direction smaller than a spacing interval in the first direction of heat pipes adjacent to ends of the stack.

The heat pipes extending in the second direction may have an arc shape with arc-shaped heat pipes closer to a center of the stack of battery cells having a greater radius of curvature than that of other arc-shaped heat pipes further from a center of the stack.

The heat dissipation fins may extend in the first direction.

Heat dissipation fins adjacent to a center of the stack of battery cells may be spaced apart at a spacing interval smaller than a spacing interval of heat dissipation fins adjacent to outer edges of the stack of battery cells.

The heat conductive sheet may include holes penetrating therethrough, the holes having a heightwise dimension that is greater than a widthwise dimension thereof.

The heat conductive sheet may include a plurality of holes penetrating therethrough to form a mesh structure.

The battery module may further include a heat generation member in thermal co-operation with the heat dispersion member.

BRIEF DESCRIPTION OF THE DRAWINGS

The above and other features and advantages will become more apparent to those of ordinary skill in the art by describing in detail exemplary embodiments with reference to the attached drawings, in which:

FIG. 2 illustrates a cross-sectional view taken along a line II-II of FIG. 1;

FIG. 4 illustrates a cross-sectional view of a battery module according to another embodiment;

DETAILED DESCRIPTION

Figure 1:
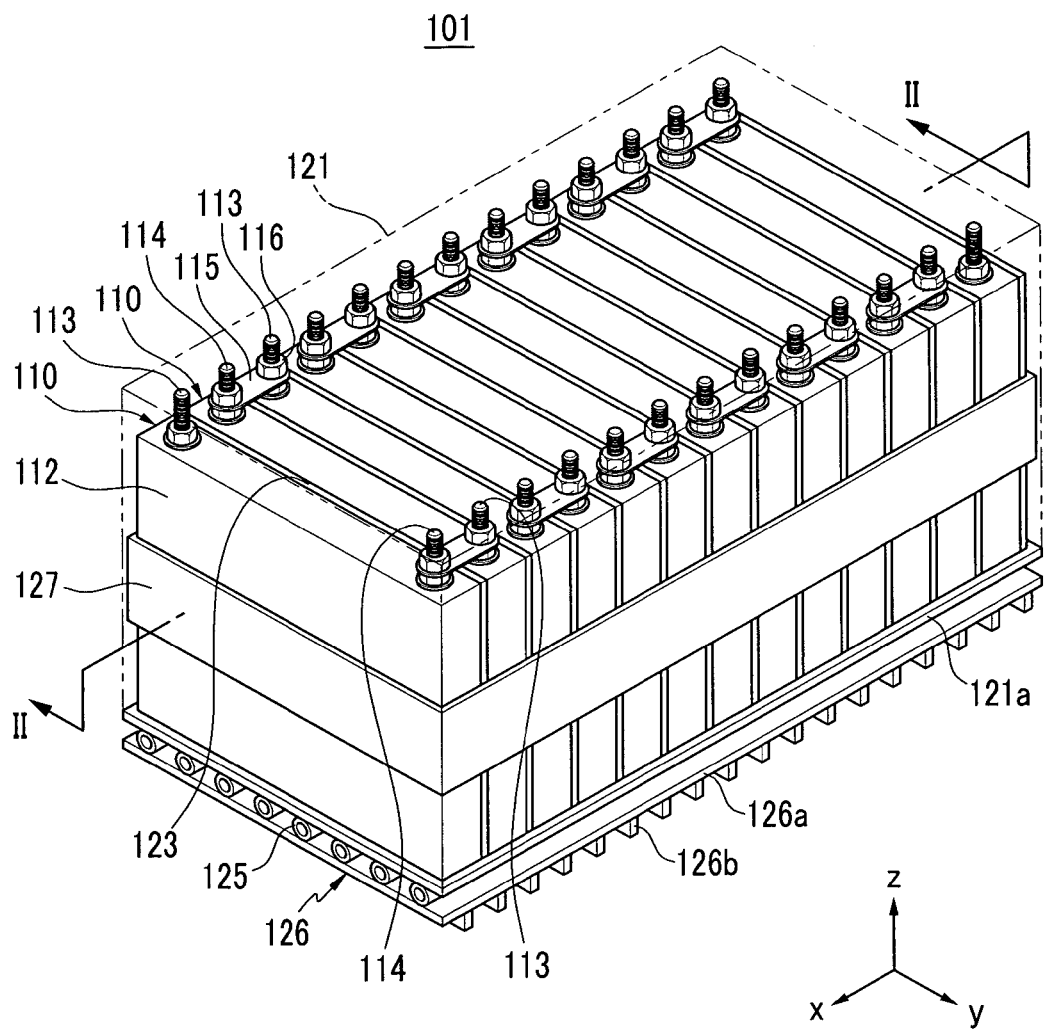
FIG. 1 illustrates a perspective view of a battery module according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 3A:
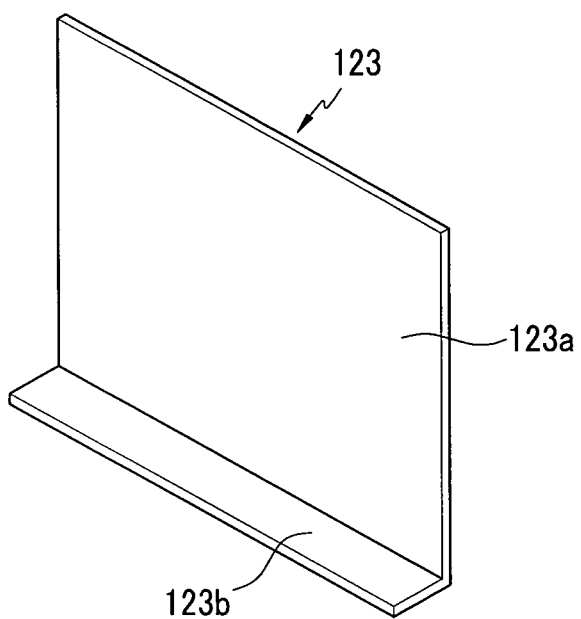
FIG. 3A illustrates a perspective view of a heat-conductive sheet of the battery module of FIG. 1.
Figure 3B:
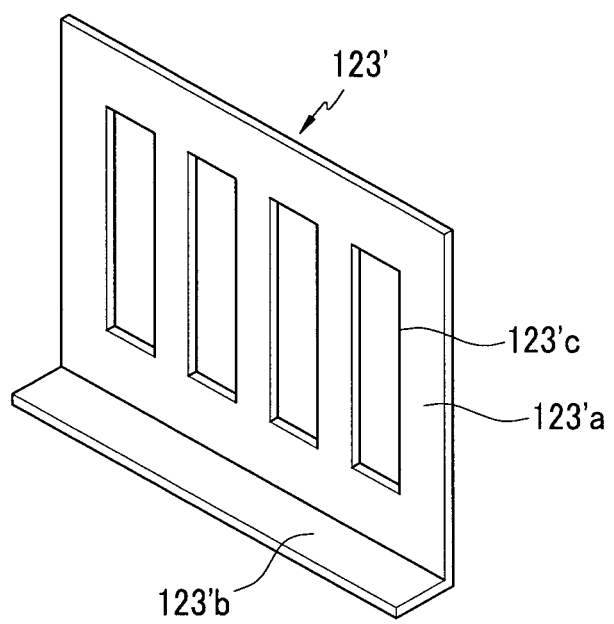
FIG. 3B illustrates a perspective view of a modified example of the heat-conductive sheet of FIG. 3A.
Figure 3C:
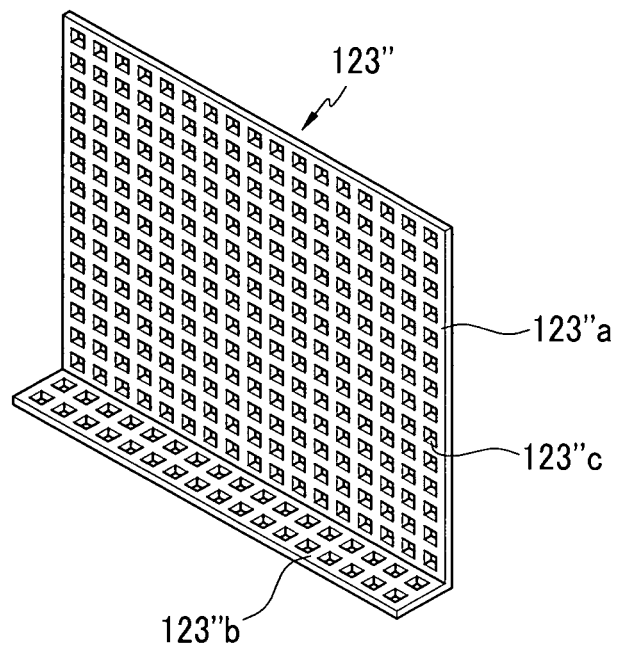
FIG. 3C illustrates a perspective view of another modified example of the heat-conductive sheet of FIG. 3A.

FIG. 1 illustrates a perspective view of a battery module according to an embodiment. FIG. 2 illustrates a cross-sectional view taken along a line II-II of FIG. 1. FIGS. 3A to 3C illustrate examples of heat conductive sheets of the battery module of FIG. 1.

Referring to FIGS. 1 and 2, a battery module 101 according to the present embodiment may include a plurality of rechargeable batteries or battery cells 110, a housing 121 accommodating the battery cells 110, heat-conductive sheets 123 in close contact or in thermal co-operation with the battery cells 110, a heat dispersion member 125 in contact or in thermal co-operation with the heat-conductive sheets 123, and a heat dissipation member 126 in contact or in thermal co-operation with the heat dispersion member 125. In an implementation, the heat dispersion member 125 may be coupled with the heat conductive sheets 123. In another implementation, the heat dissipation member 126 may be coupled with the heat dispersion member 125.

In an implementation, the battery cell 110 may be a lithium ion rechargeable battery and may have a square shape. Such an implementation will be described as an example. However, the embodiments are not limited thereto, and the embodiments are applicable to various types of batteries, e.g., a lithium polymer battery and/or a cylindrical battery.

The battery cells 110 may be stacked side by side. For example, the battery cells 110 may be arranged in a stack that extends in a first direction. Positive terminals 113 and negative terminals 114 of the neighboring battery cells 110 may be alternately disposed. The positive terminal 113 of one of the battery cells 110 and a negative terminal 114 of a next battery cell 110 may be electrically connected by a bus bar 115. Accordingly, the battery cells 110 may be connected in series by the bus bars 115; and the bus bars 115 may be rigidly fixed to the terminals 113 and 114 by nuts 116.

The battery cells 110 may be fixed as one body by a band 127. For example, the band 127 may surround the stacked battery cells 110 and may be made of an elastic material. However, the embodiments are not limited thereto. For example, the battery cells 110 may be fixed by, e.g., a tie bar fixing an end plate and another end plate.

The heat-conductive sheets 123 may be between the battery cells 110 and may be brought into close contact with entire wide side surfaces of the battery cells 110. For example, the heat-conductive sheets 123 may be in thermal co-operation with the wide side surfaces of the battery cells 110. The heat-conductive sheets 123 may be formed of a metal, e.g., copper, aluminum, or anodized aluminum. In an implementation, the heat-conductive sheets 123 may be formed of, e.g., a heat-conductive silicon sheet or a graphite heat dissipation sheet that uses carbon fibers and carbon nano-tubes as a heat conductive material. The graphite heat dissipation sheet may exhibit superior heat conductivity and may have an electrical insulation property, which may help ensure heat conductivity and electrical safety.

The heat-conductive sheets 123 may each have a thickness of about 0.1 mm to about 1 mm. Accordingly, heat generated in the battery cells 110 may be effectively radiated or dissipated without an excessive increase in overall volume of the battery module 101. In contrast to a method of forming an air flow path between battery cells by using partitions, by including the heat-conductive sheets 123, it is possible to remarkably reduce the volume. The volume of the battery module 101 may greatly influence an overall performance and structure of an apparatus adapting the battery module 101. For this reason, it is desirable to reduce the volume of the battery module 101.

The housing 121 may have a hexahedral shape having internal space. Thus, the battery cells 110 may be accommodated in the housing 121. As shown in FIGS. 2 and 3A, the heat-conductive sheets 123 may be installed through a bottom 121a of the housing 121 and each of the heat-conductive sheets 123 may include a heat absorption part 123a in thermal co-operation with corresponding battery cells 110 and a heat radiation part 123b being bent to extend away from the heat absorption part 123a and passing through the bottom 121a. The heat absorption part 123a may entirely cover the wide side surface of a corresponding battery cell 110; and the heat radiation part 123b may be bent and brought into close contact or thermal co-operation with an exterior of the bottom 121a of the housing. In an implementation, the heat radiation part 123b may be in thermal co-operation with the heat dissipation member 125.

The bottom 121a of the housing 121 may be formed of a material that exhibits superior heat conductivity, e.g., aluminum, copper, or stainless steel. Also, the bottom 121a of the housing 121 may have a structure in which glass fibers are inserted into a synthetic resin material, e.g., PP (polypropylene), PBT (poly butylene terephthalate), PET (poly ethylene terephthalate), and PFA (perfluoro alkoxy alkane).

As shown in FIG. 3B, in an implementation, a heat-conductive sheet 123' may have a heat absorption part 123'a and a heat radiation part 123'b bent from the heat absorption part 123'a. The heat-conductive sheet 123' may have a structure in which holes 123'c are formed in the heat absorption part 123'a. The holes 123'c may be long in a height direction of the rechargeable batters 110. For example, the holes 123'c may have a heightwise dimension that is greater than a widthwise dimension thereof. Accordingly, heat transmitted to the heat absorption part 123'*a* may be conducted in the height direction of the heat-conductive sheet 123', thereby quickly transmitting the heat to the heat radiation part 123'*b*.

As shown in FIG. 3C, in an implementation, a heat-conductive sheet 123" may have a heat absorption part 123"*a* and a heat radiation part 123"*b* bent from the heat absorption part 123"*a*. The heat-conductive sheet 123" may have a mesh structure in which holes 123"*c* are formed in the heat-conductive sheet 123". Including the heat-conductive sheet 123" having the mesh structure may help ensure that the heat-conductive sheet 123" is able to reduce weight of the battery module 101.

Figure 5A:
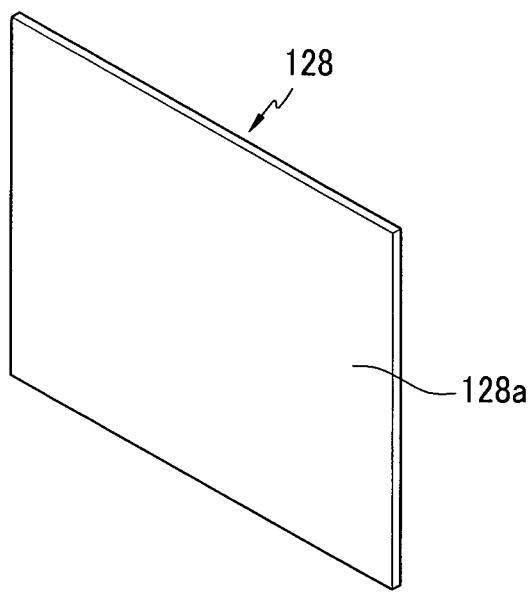
FIG. 5A illustrates a perspective view of a subsidiary heat-conductive sheet of the battery module of FIG. 4.
Figure 5B:
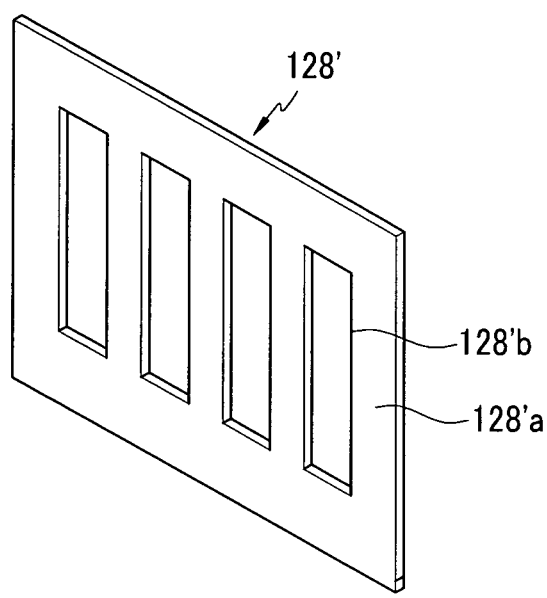
FIG. 5B illustrates a perspective view of a modified example of the subsidiary heat-conductive sheet of FIG. 5A.
Figure 5C:
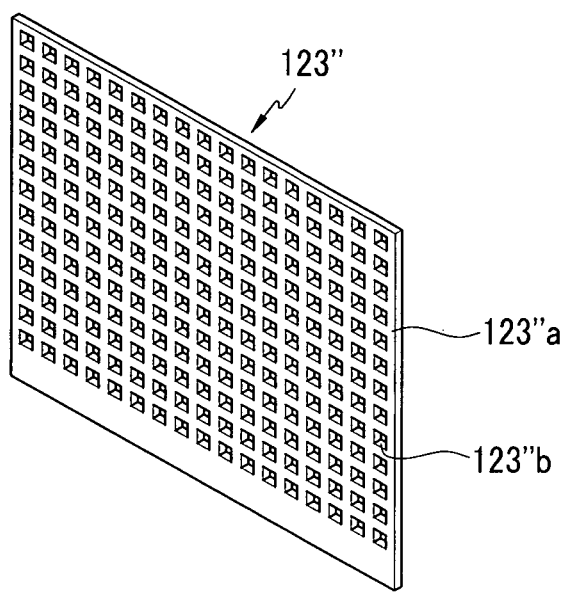
FIG. 5C illustrates a perspective view of another modified example of the subsidiary heat-conductive sheet of FIG. 5A.

FIG. 4 illustrates a cross-sectional view of a battery module according to another embodiment. FIGS. 5A to 5C illustrate examples of subsidiary heat conductive sheets of the battery module of FIG. 4.

A battery module 101' according to the present embodiment may have a structure similar to the previous embodiment except for structures of the subsidiary heat conductive sheet 128. Thus, a repeated description of identical structures is omitted.

Referring to FIG. 4, one or more subsidiary heat-conductive sheet 128 may be included between the heat-conductive sheet 123 and the battery cell 110.

For example, four subsidiary heat-conductive sheets 128 may be included between battery cells 110 in a center portion of the battery module 101', where a relatively large amount of heat may be generated; and one subsidiary heat-conductive sheet 128 may be included between battery cells 110 in an edge portion of the battery module 101', where a relatively small amount of heat may be generated. In an implementation, two or three subsidiary heat-conductive sheets 128 may be included between battery cells 110 at portions between the center portion and the edge portion.

Including the subsidiary heat-conductive sheets 128 as described above may help ensure that heat of a portion where a large amount of heat is generated is quickly dissipated, which makes it possible to uniformly maintain temperatures of the battery cells 110'.

As shown in FIGS. 4 and 5A, the subsidiary heat-conductive sheets 128 may be installed through the bottom 121*a* of the housing 121; and each of the subsidiary heat-conductive sheets 128 may have a subsidiary heat absorption part 128*a* contacting or in thermal co-operation with the heat-conductive sheet 123 and passing through the bottom 121*a*.

For example, the subsidiary heat absorption part 128*a* may contact or may be in thermal co-operation with a rear surface of a corresponding heat-absorption part 123*a* and the wide side surface of a corresponding battery cell 110. A lower part of the subsidiary heat absorption part 128*a* may contact or may be in thermal co-operation with the heat radiation part 123*b* of a corresponding heat-conductive sheet 123

As shown in FIG. 5B, in an implementation, a subsidiary heat-conductive sheet 128' may have a subsidiary heat absorption part 128'*a* and may have a structure in which holes 128'*b* are formed in the subsidiary heat absorption part 128'*a*. Each of the holes 128'*b* may be long in a height direction of the battery cell 110. For example, the holes 128'*b* may have a heightwise dimension that is greater than a widthwise dimension thereof.

As shown in FIG. 5C, in an implementation, a subsidiary heat-conductive sheet 128" may have a subsidiary heat absorption part 128"*a* and may have a mesh structure in which holes 128"*b* are formed in the subsidiary heat-conductive sheet 128".

Referring again to FIG. 2, the heat dispersion member 125 may provide a coolant path and may be disposed below the heat radiation parts 123*b* to be in close contact or in thermal co-operation with the heat radiation parts 123*b*. The heat dispersion member 125 may include heat pipes, may extend in the first direction, e.g., the direction in which the battery cells 110 are stacked (an x-axis direction of FIG. 1), and the heat pipes may be arranged at intervals along a second direction, e.g., a width direction of the battery cells 110 (a y-axis direction of FIG. 1). In an implementation, the second direction may be substantially perpendicular to the first direction.

However, the embodiments are not limited thereto. The heat dispersion member 125 may have various structures, e.g., a hollow plate structure, as long as they can form or provide a coolant path. A fluid having a large specific heat, e.g., a coolant, may flow inside the heat dispersion member 125. The coolant may include, e.g., water, alcohol, CFC (chlorofluorocarbon), etc.

The heat dissipation member 126 may include heat dissipation fins 126*b* and may be provided below the heat dispersion member 125. The heat dissipation member 126 may include a support plate 126*a* in contact or in thermal co-operation with the heat dispersion member 125 as well as the heat dissipation fins 126*b* protruding from the support plate 126*a*. In an implementation, the support plate 126*a* may be coupled to the heat dispersion member 125 with a heat-conductive adhesive. The heat-conductive adhesive may include, e.g., a thermal grease, a thermal compound, etc.

The heat dissipation fins 126*b* may extend in the second direction, e.g., the width direction of the battery cells 110 (the y-axis direction of FIG. 1) and may be arranged at intervals along the first direction, e.g., the direction in which the battery cells 110 are stacked (the x-axis direction of FIG. 1).

Providing the heat-conductive sheets 123 between the battery cells 110 and in thermal co-operation with the heat dispersion members 125 may help ensure that heat generated in the battery cells 110 is easily transmitted to the heat dispersion member 125. Further, the heat dispersion member 125 and the heat dissipation member 126 may be disposed such that heat may also dissipate through the heat dissipation member 126, thereby facilitating quicker heat dissipation. As described above, the heat dispersion member 125 may include heat pipes. The heat pipes may be formed of one or more of materials with a high conductivity, may disperse heat transmitted from the heat-conductive sheets 123, and may quickly transmit the heat to the heat dissipation member 126. Accordingly, heat dissipation efficiency may be further improved. The structure including the heat pipes extending in the first direction, e.g., the direction in which the battery cells 110 are stacked, may help ensure that heat generated in the central portion of the battery module 101 is uniformly conducted to the heat pipes and that the heat pipes are cooled by the heat dissipation member 126. Accordingly, the battery cells 110 can be uniformly cooled.

Figure 6:
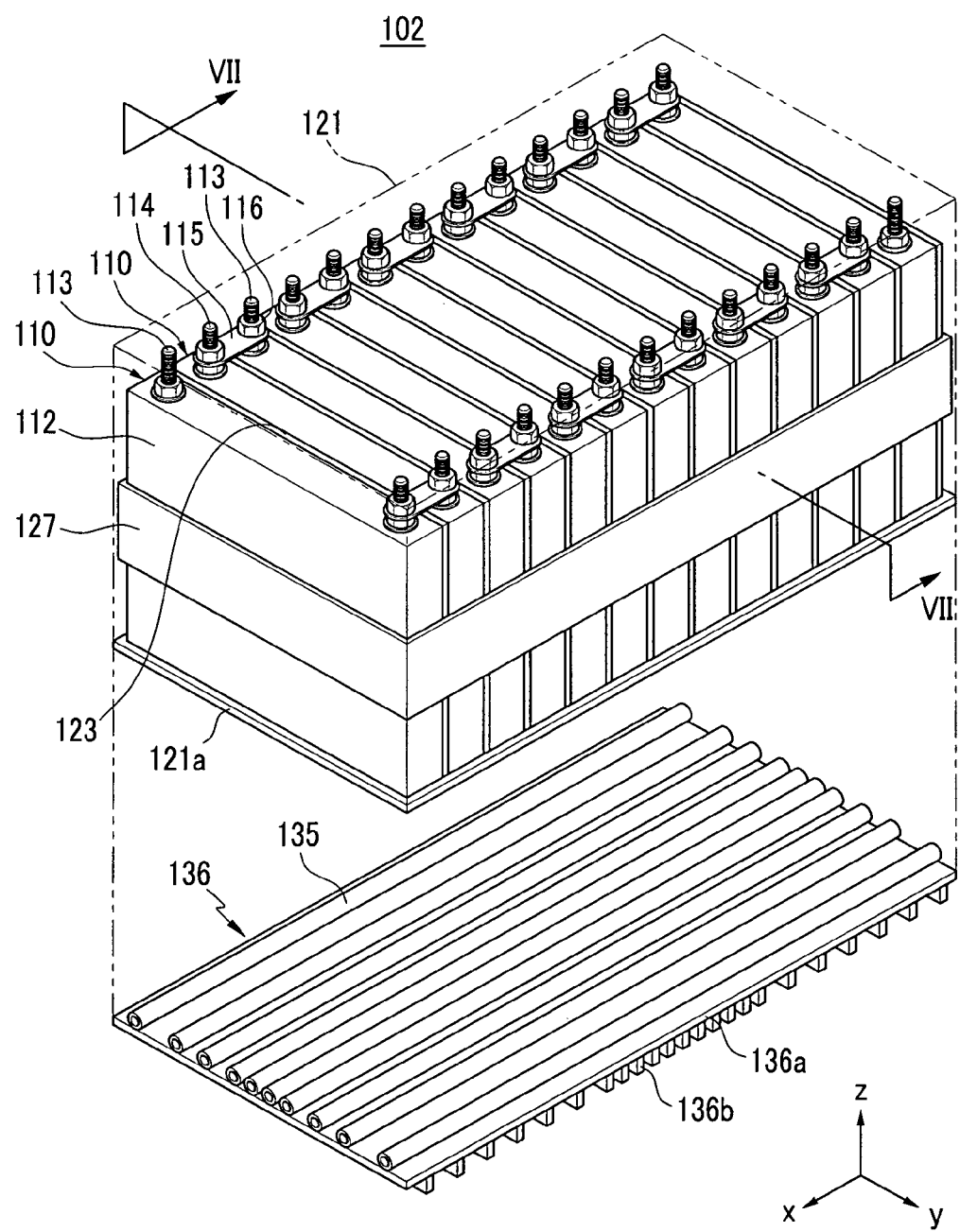
FIG. 6 illustrates an exploded perspective view of a battery module according to yet another embodiment.
Figure 7:
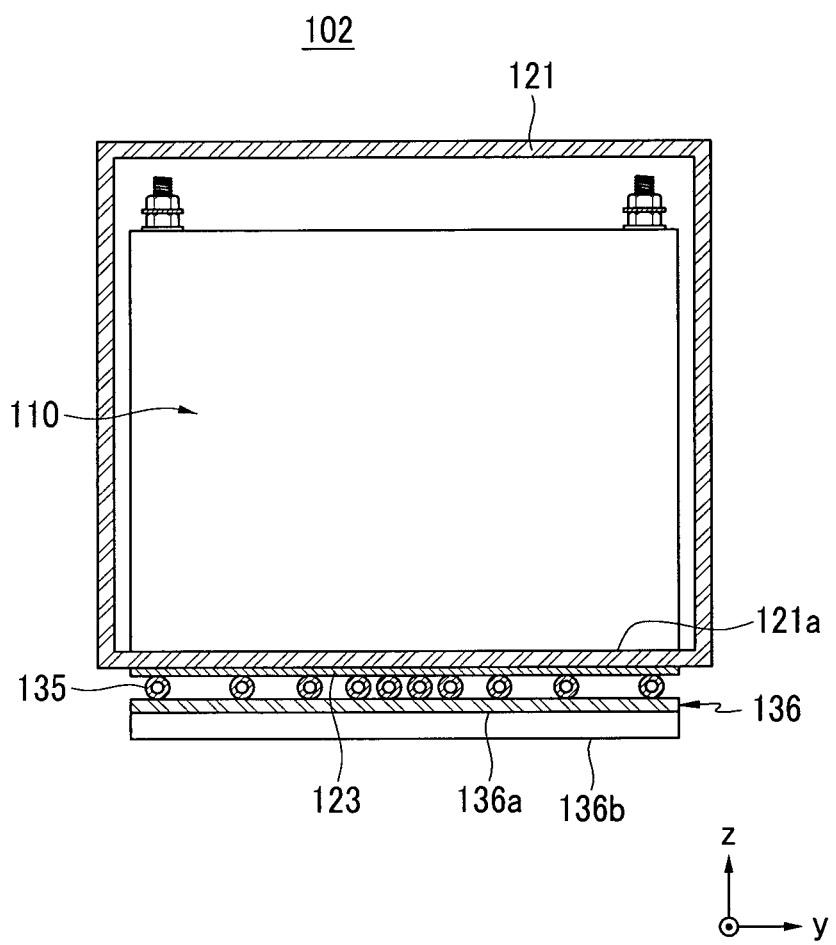
FIG. 7 illustrates a cross-sectional view of the battery module of FIG. 6 in an assembled state, taken along a line VII-VII of FIG. 6.

FIG. 6 illustrates an exploded perspective view of a battery module according to yet another embodiment. FIG. 7 illustrates a cross-sectional view of the battery module of FIG. 6 in an assembled state, taken along a line VII-VII of FIG. 6.

Referring to FIGS. 6 and 7, a battery module 102 according to the present embodiment may have the same structure as the previous embodiment except for structures of a heat dispersion member 135 and a heat dissipation member 136. Thus, a repeated description of identical structures is omitted.

The heat dispersion member 135 may include heat pipes in contact or in thermal co-operation with the heat-conductive sheets 123. The heat pipes of the heat dispersion member 135 may extend in the first direction, e.g., the direction in which the battery cells 110 are stacked (an x-axis direction of FIG. 6). In an implementation, the heat pipes of the heat dispersion member 135 may be disposed at intervals along the second direction, e.g., the width direction of the battery cells 110, such that an interval between the heat pipes of the heat dispersion member 135 in the central portion of the battery cells 110 in the second is smaller than an interval between heat dispersion members 135 in an edge portion. For example, heat pipes adjacent to a central axis of each of the battery cells 110 may be spaced apart at a spacing interval smaller than a spacing interval of heat pipes adjacent to outer sides of the battery cells 110. For example, a greater number of heat pipes of the heat dispersion member 135 may be included in the central portion of the battery cells 110. Thus, an interval between the heat pipes of the heat dispersion member 135 may be smaller. Accordingly, a relatively large amount of heat generated in the central portion of the battery module 102 may be quickly transmitted to the heat dissipation member 136 through the heat dispersion member 135. The heat dispersion member 135 may quickly transmit heat. However, the heat pipes of the heat dispersion member 135 may extend in the first direction. Thus, the heat dispersion member 135 may be limited in its ability to regulate the temperature at the center of the battery module 102. However, if a greater number of heat pipes are installed near the center of the battery module 102, as in the present embodiment, heat generated in the center of the battery module 102 may be dissipated quicker.

The heat dissipation member 136 may include a heat sink that includes a support plate 136a and heat dissipation fins 136b protruding form the support plate 136a. The heat dissipation fins 136b may extend in the second direction, e.g., the width direction of the battery cells 110, and may be arranged at intervals along the first direction, e.g., the direction in which the battery cells 110 are stacked. The heat dissipation fins 136b may be disposed such that an interval between heat dissipation fins 136b in the central portion of the battery module 102 is smaller than an interval between heat dissipation fins 136b in an edge portion. For example, the heat dissipation fins 136b adjacent to a center of the stack of battery cells 110 may be spaced apart at a spacing interval smaller than a spacing interval of heat dissipation fins adjacent to outer edges of the stack of battery cells 110. For example, a greater number of heat dispersion fins 136b may be included in the central portion of the battery module 102. Thus, an interval between the heat dissipation fins 136b may be smaller. Accordingly, heat generated in battery cells 110 in the central portion of the battery module 102 may dissipate more quickly, even when temperatures of the battery cells 110 in the central portion of the battery module 102 are relatively high, thereby uniformly cooling the battery cells 110. Even when the heat dispersion member 135 quickly transmits heat, heat of the battery cells 110 in the central portion of the battery module 102 may be transmitted to battery cells 110 positioned in an edge. However, according to the present embodiment, more heat dissipation fins 136b may be included the central portion of the heat dissipation member 136 such that a larger amount of heat may dissipate in the center of the heat dissipation member 136. Thus, heat generated in the center portion of the battery module 102 may dissipate quickly.

Figure 8:
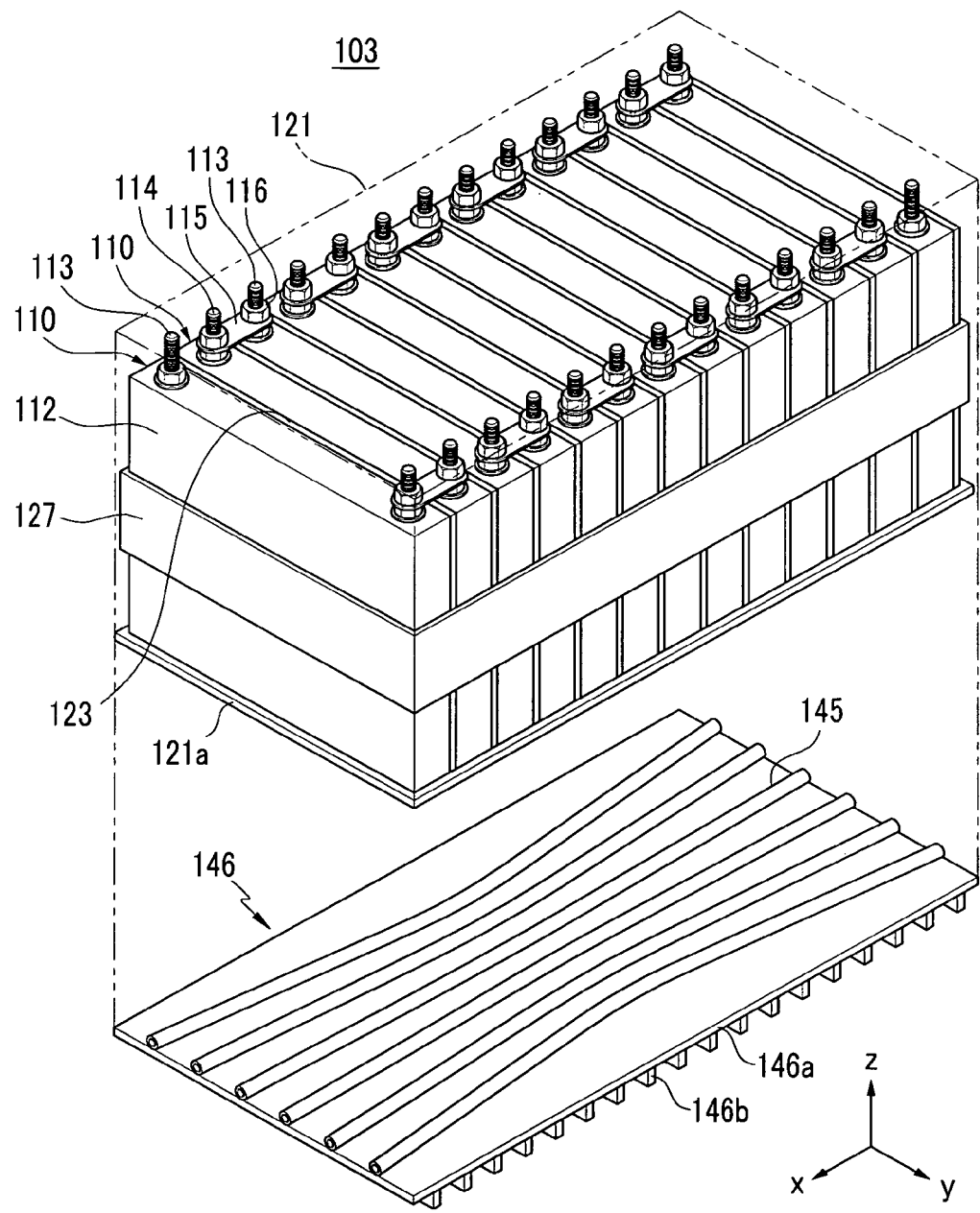
FIG. 8 illustrates an exploded perspective view of a battery module according to still another embodiment.

FIG. 8 illustrates an exploded perspective view of a battery module according to still another embodiment.

Referring to FIG. 8, a battery module 103 according to the present embodiment may have the same structure as the previous embodiment except for structures of a heat dispersion member 145. Thus, a repeated description of identical structures is omitted.

The heat dispersion member 145 may include heat pipes in contact or in thermal co-operation with the heat-conductive sheets 123. The heat pipes of the heat dispersion member 145 may be disposed at intervals along the second direction, e.g., the width direction of the battery cells 110 (a y-axis direction in FIG. 8), and may extend in the first direction, e.g., the direction in which the battery cells 110 are stacked (an x-axis direction in FIG. 8).

The heat dispersion members 145 may have an arc shape having a longitudinal center lying toward the center portion of the battery cells 110 (e.g., the y-axis direction in FIG. 6). For example, the heat pipes may extend in the first direction and have an arc shape with a concavity open toward an outer side of the battery cells 110. Accordingly, an interval between heat dispersion members 145 in an edge may be larger than an interval between heat dispersion members 145 in the center portion.

For example, the heat pipes of the dispersion member 145 may be concentrated in the center portion of the battery module 103 and may be dispersed in the edge portion. Accordingly, heat generated in the center portion of the battery module 103 may be dispersed through the heat dispersion member 145 and may be transmitted to a heat dissipation member 146. Therefore, it is possible not only to quickly dissipate heat through the heat dissipation member 146 but also to uniformly cool the battery cells 110.

The heat dissipation member 146 may include a heat sink that includes a support plate 146a and heat dissipation fins 146b protruding from the support plate 146a. The heat dissipation fins 146b may extend in the second direction, e.g., the width direction of the battery cells 110, and may be arranged at intervals along the first direction, e.g., the direction in which the battery cells 110 are stacked.

Figure 9:
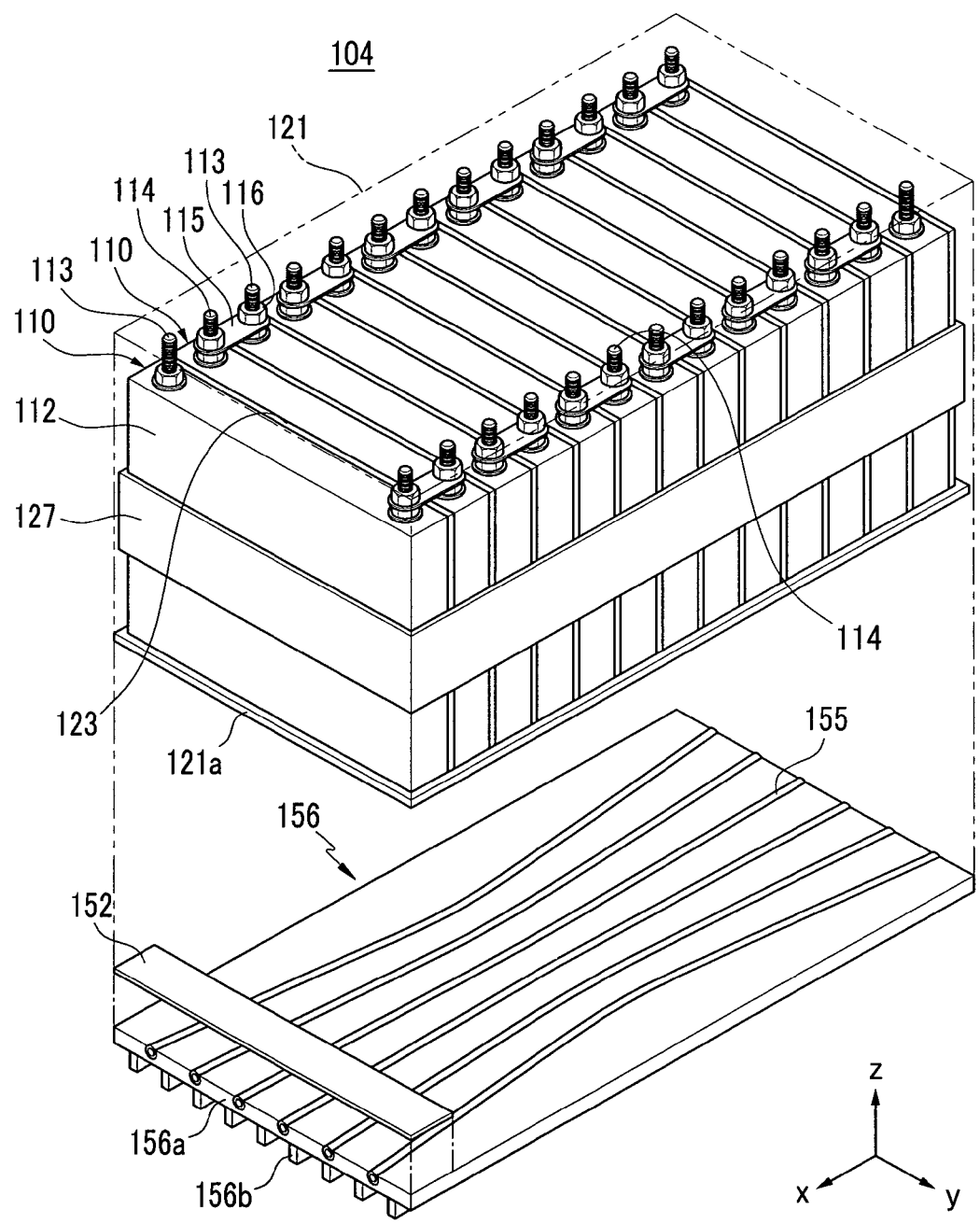
FIG. 9 illustrates an exploded perspective view of a battery module according to still another embodiment.

FIG. 9 illustrates an exploded perspective view of a battery module according to still another embodiment.

Referring to FIG. 9, a battery module 104 according to the present embodiment may have the same structure as the previous embodiment except for structures of a heat dispersion member 155 and a heat dissipation member 156. Thus, a repeated description of identical structures is omitted.

The heat dispersion member 155 may include heat pipes in contact or in thermal co-operation with the heat-conductive sheets 123. The heat pipes of the heat dispersion member 155 may be disposed at intervals along the second direction, e.g., the width direction of the battery cells 110 (y-axis direction in FIG. 9), and may extend in the first direction, e.g., the direction in which the battery cells 110 are stacked (x-axis direction in FIG. 9). The heat pipes of the heat dispersion member 155 may have an arc shape having a longitudinal center lying toward the center of the battery cells 110. For example, the heat pipes may extend in the first direction and may have an arc shape with a concavity open toward an outer side of the battery cells 110. Accordingly, an interval between heat pipes of the heat dispersion member 155 at an edge portion of the battery cells 110 may be larger than an interval between heat pipes of the heat dispersion member 155 at the center portion of the battery cells 110.

For example, the heat pipes of the heat dispersion member 155 may be concentrated in a center region of the battery cells 110 and may be dispersed in an edge region. Accordingly, heat generated in the center of the battery module 104 may be dispersed through the heat dispersion member 155 and may be transmitted to a heat dissipation member 156. Therefore, it is possible not only to quickly dissipate heat through the heat dissipation member 156 but also to uniformly cool the battery cells 110.

The heat dissipation member 156 may include a heat sink that includes a support plate 156a as well as heat dissipation fins 156b protruding from the support plate 156a. The heat dissipation fins 156b may extend in the first direction and may be arranged at intervals along the second direction.

Also, the heat pipes of the heat dispersion member 155 may be partially inserted into the support plate 156a and may be partially exposed from the top of the support plate 156a. For example, the support plate 156a of the heat dissipation member 156 may include grooves and the heat pipes of the heat dispersion member 155 may be disposed in the grooves.

The exposed portions of the heat pipes of the heat dispersion member 155 may contact or may be in thermal co-operation with the heat-conductive sheets 123 and may receive heat from the heat-conductive sheets 123. The portions of the heat pipes inserted into the support plate 156a may transmit the heat to the heat dissipation member 156. If the heat pipes are inserted into the support plate 156a and are in thermal co-operation with the support plate 156a as described above, the heat dispersion member 155 may transmit heat to the support plate 156a more quickly.

The battery module 104 according to the present embodiment may further include a heat generator 152 in thermal co-operation with the heat dispersion member 155. The heat generator 152 may extend in the second direction and may be coupled to the individual heat pipes of the heat dispersion member 155. The heat generator 152 may include any one of various members, e.g., a thermoelectric element, a hot wire, etc.

Accordingly, heat generated in the heat generator 152 may be quickly transmitted to the heat-conductive sheets 123 through the heat dispersion members 155, thereby ensuring uniform heating of the battery cells 110 in low-temperature environment.

At a low temperature, ions inside the battery cells 110 may not move properly, thereby resulting in low charge and discharge efficiency. For example, when a battery module is installed in a car or is used as an external power storage device at a subzero temperature in winter, charge and discharge efficiency may be lowered. However, according the present embodiment, the battery cells 110 may be quickly heated by the heat generator 152 through the heat dispersion member 155 and the heat-conductive sheets 123. Thus, charge and discharge efficiency may be improved.

Figure 10:
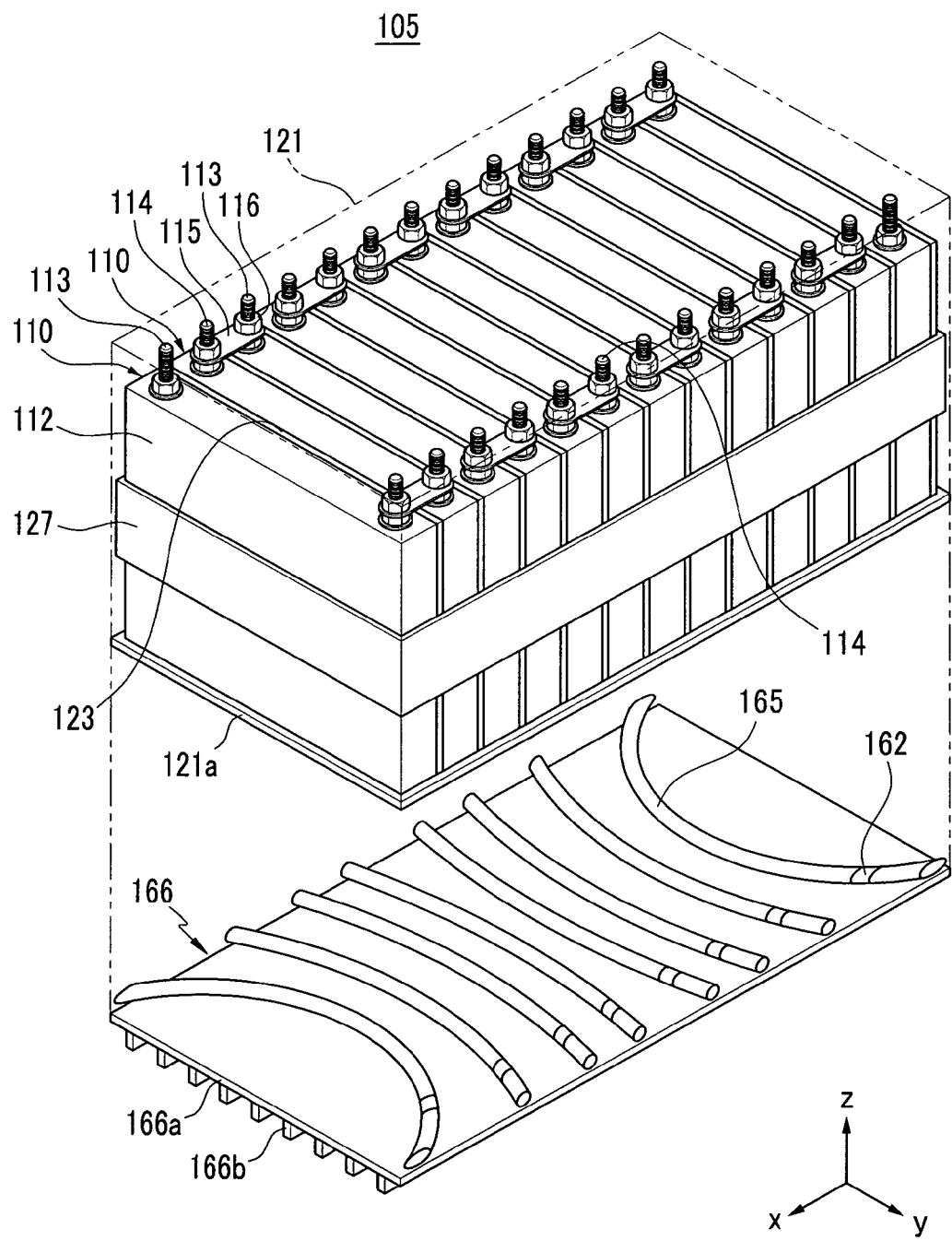
FIG. 10 illustrates an exploded perspective view of a battery module according to still another embodiment.

FIG. 10 illustrates an exploded perspective view of a battery module according to still another embodiment.

Referring to FIG. 10, a battery module 105 according to the present embodiment may have the same structure as the previous embodiment except for structures of a heat dispersion member 165 and a heat dissipation member 166. Thus, a repeated description of identical structures is omitted.

The heat dispersion member 165 may include heat pipes in thermal co-operation with the heat-conductive sheets 123. The heat pipes of the heat dispersion member 165 may be disposed at intervals along the first direction, e.g., the direction (in which the battery cells 110 are stacked an x-axis direction in FIG. 10), and may extend in the second direction, e.g., the width direction of the battery cells 110 (a y-axis direction in FIG. 10).

The heat dispersion members 165 may have an arc shape having a longitudinal center lying toward the center of the battery cells 110. For example, the heat pipes extending in the second direction may have an arc shape with arc-shaped heat pipes closer to a center of the stack of battery cells 110 having a greater radius of curvature than that of other arc-shaped heat pipes further from a center of the stack.

Accordingly, an interval between heat pipes of the heat dispersion member 165 adjacent to edges of the battery cells 110 may be larger than an interval between heat pipes of the heat dispersion member 165 in the center portion of the stack.

For example, in the battery module 105, the heat pipes of the heat dispersion member 165 may be concentrated in the center of the battery cells 110 and may be dispersed in the edges. In this structure, heat generated in the center of the battery module 105 may be dispersed through the heat dispersion member 165 and may be transmitted to the heat dissipation member 166.

The heat dissipation member 166 may include a heat sink that includes a support plate 166a as well as heat dissipation fins 166b protruding from the support plate 166a. The heat dissipation fins 166b may extend in the first direction and may be arranged at intervals along the second direction.

Therefore, it is possible not only to quickly dissipate heat through the heat dissipation member 166 but also to uniformly cool the battery cells 110.

Further, a heat generator 162 may be attached to the heat dispersion member 165. Thus, in low-temperature environment, the heat generator 162 may heat the heat dispersion member 165, resulting in improved charge and discharge efficiency. The heat generator 162 may include, e.g., a thermoelectric element, heat wire, etc.

Figure 11:
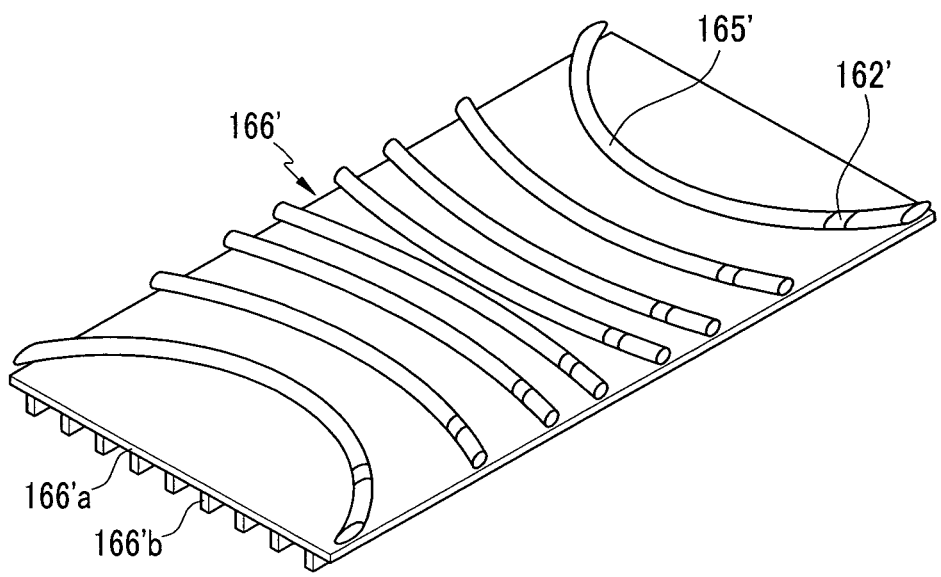
FIG. 11 illustrates a perspective view of a modified example of a heat dissipation member of the battery module of FIG. 10.

FIG. 11 illustrates a perspective view of a modified example of the heat dissipation member of the battery module of FIG. 10.

Referring to FIG. 11, the modified example of the heat dissipation member 166' according to the present embodiment may have the same structure as the previous example except for a spacing interval of heat pipes of the heat dispersion member 165' adjacent to a center of a heat dissipation member 166'.

For example, as shown in FIG. 10, a spacing interval among the heat pipes of the heat dispersion member 165 adjacent to a center portion of the heat dissipation member 166 may be about equal to a spacing interval of the heat pipes of the heat dispersion member 165 adjacent to outer edges of the heat dissipation member 166.

However, according to the present modified example, the spacing interval of the heat pipes of the heat dispersion member 165' adjacent to the center of the heat dissipation member 166' may be spaced apart at a spacing interval smaller than a spacing interval of heat pipes of the heat dispersion member 165' adjacent to outer edges of the heat dissipation member 166'.

If the spacing interval of the heat pipes of the heat dispersion member 165' adjacent to the center of the heat dissipation member 166' is formed as described above, heat generated adjacent to the center portion may be quickly dispersed and dissipated, which makes it possible to uniformly maintain the temperatures of the battery cells 110.

The embodiments provide a battery module having an improved temperature adjustment function.

According to the embodiments, the heat-conductive sheets disposed between the battery cells may be in thermal co-operation with the heat dispersion members; and the heat dispersion members may be in thermal co-operation with a heat sink. Thus, heat generated in the battery cells may be efficiently dissipated. Further, when a heat generator is connected to the heat dispersion members, the battery cells may be heated through the heat-conductive sheets in low-temperature environment. Thus, charge and discharge efficiency in a low-temperature environment may be improved.

The structure of the battery module according to the embodiments may help ensure proper heat dissipation. Thus, the internal temperature of the battery cell may be maintained at a suitably low level, thereby increasing the lifetime of the battery cell. Further, maintaining the temperature of the battery cell at the suitably low level may help prevent the battery cell from igniting or exploding.

Furthermore, the structure of the battery module according to the embodiments may help ensure that sufficient ion conductivity at a low temperature, thereby ensuring good output performance of the battery module.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery module, comprising:
   a plurality of adjoining battery cells;
   heat conductive sheets, a heat conductive sheet among the heat conductive sheets between adjacent battery cells, the heat conductive sheets being in thermal co-operation with the battery cells;
   a heat dispersion member coupled with the heat conductive sheets and in thermal co-operation therewith;
   a heat dissipation member coupled with the heat dispersion member and in thermal co-operation therewith; and
   one or more heat conductive subsidiary sheets between adjacent battery cells in a center portion of the battery module;
   a housing accommodating the battery cells,
   wherein:
   the battery cells are arranged in a stack that extends in a first direction,
   the heat dispersion member is between the heat dissipation member and the battery cells, the heat dispersion member including a coolant path for a coolant to flow therethrough, the coolant path including a plurality of heat pipes,
   each of the heat conductive sheets includes a heat absorption part and a heat radiation part, the heat absorption part being between the adjacent battery cells and in thermal co-operation with a wide side surface of the battery cells, the heat radiation part being bent to extend away from the heat absorption part and being between the battery cells and the heat dispersion member,
   the heat conductive sheets are installed through a bottom of the housing, and
   the heat radiation part is in thermal cooperation with an exterior of the bottom.

2. The battery module as claimed in claim 1, wherein the heat dissipation member includes a support plate and heat dissipation fins, the heat dissipation fins protruding from the support plate and the support plate being between the heat dissipation fins and the heat dispersion member.

3. The battery module as claimed in claim 2, wherein the heat dissipation fins extend in a second direction substantially perpendicular to the first direction.

4. The battery module as claimed in claim 2, wherein the heat dissipation fins adjacent to a center of the stack of battery cells are spaced apart at a spacing interval smaller than a spacing interval of the heat dissipation fins adjacent to outer edges of the stack of battery cells.

5. The battery module as claimed in claim 2, wherein the support plate of the heat dissipation member includes grooves and the heat dispersion member is disposed in the grooves.

6. The battery module as claimed in claim 1, wherein the heat pipes extend in the first direction and are spaced apart from each other along a second direction perpendicular to the first direction.

7. The battery module as claimed in claim 6, wherein the heat pipes adjacent to a central axis of each of the battery cells are spaced apart at a spacing interval smaller than a spacing interval of the heat pipes adjacent to outer sides of the battery cells.

8. The battery module as claimed in claim 1, wherein the heat pipes extend in the first direction and have an arc shape with a concavity open toward an outer side of the battery cells.

9. The battery module as claimed in claim 1, wherein the heat pipes extend in a second direction different from the first direction and are spaced apart from one another in the first direction.

10. The battery module as claimed in claim 9, wherein the heat pipes adjacent to a center of the stack of battery cells are spaced apart at a spacing interval in the first direction smaller than a spacing interval in the first direction of the heat pipes adjacent to ends of the stack.

11. The battery module as claimed in claim 9, wherein the heat pipes extending in the second direction have an arc shape with heat pipes closer to a center of the stack of battery cells having a greater radius of curvature than that of heat pipes further from the center of the stack.

12. The battery module as claimed in claim 9, wherein the heat dissipation fins extend in the first direction.

13. The battery module as claimed in claim 12, wherein the heat dissipation fins adjacent to a center of the stack of battery cells are spaced apart at a spacing interval smaller than a spacing interval of the heat dissipation fins adjacent to outer edges of the stack of battery cells.

14. The battery module as claimed in claim 1, wherein each of the heat conductive sheets includes holes penetrating entirely therethrough in the first direction, the holes having a heightwise dimension in a direction extending toward the heat radiation part that is greater than a widthwise dimension thereof.

15. The battery module as claimed in claim 1, wherein the heat conductive sheets include a plurality of holes penetrating therethrough to form a mesh structure.

16. The battery module as claimed in claim 1, further comprising a heat generation member in thermal co-operation with the heat dispersion member.

17. The battery module as claimed in claim 1, wherein each of the plurality of heat pipes is directly coupled with the heat conductive sheets and in thermal co-operation therewith.

* * * * *